US009098912B2

(12) United States Patent
Kriston et al.

(10) Patent No.: US 9,098,912 B2
(45) Date of Patent: Aug. 4, 2015

(54) METHOD, SYSTEM AND COMPUTER READABLE MEDIUM FOR AUTOMATIC SEGMENTATION OF A MEDICAL IMAGE

(71) Applicant: General Electric Company, Schenectady, NY (US)

(72) Inventors: Andras Kriston, Szeged (HU); Ferenc Kovacs, Szeged (HU); Gergely Nyiri, Szeged (HU); Marta Fidrich, Szeged (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 100 days.

(21) Appl. No.: 13/736,575

(22) Filed: Jan. 8, 2013

(65) Prior Publication Data
US 2013/0188846 A1 Jul. 25, 2013

(30) Foreign Application Priority Data
Jan. 24, 2012 (EP) .................................. 12462003

(51) Int. Cl.
*G06K 9/00* (2006.01)
*G06T 7/00* (2006.01)
(52) U.S. Cl.
CPC ..... *G06T 7/0081* (2013.01); *G06T 2207/20076* (2013.01); *G06T 2207/20128* (2013.01); *G06T 2207/20141* (2013.01); *G06T 2207/20156* (2013.01); *G06T 2207/30004* (2013.01)
(58) Field of Classification Search
None
See application file for complete search history.

(56) References Cited

U.S. PATENT DOCUMENTS

| 7,259,762 | B2 | 8/2007 | Tanacs |
| 2007/0160277 | A1 | 7/2007 | Slabaugh |
| 2010/0054525 | A1 | 3/2010 | Gong |
| 2010/0067754 | A1* | 3/2010 | Collins et al. ................. 382/128 |
| 2010/0128946 | A1* | 5/2010 | Fidrich et al. ................. 382/131 |

OTHER PUBLICATIONS

European Search Report from corresponding European Application No. 12462003.0, Dated Aug. 1, 2012
Igual et al., "A Fully Automatic Caudate Nucleus Segmentation of Brain MRI: Application in Volumetric Analysis of Pediatric Attention-deficit/hyperactivity Disorder", BioMedical Engineering OnLine, vol. 10, pp. 1-24, 2011.
Rexilius et al., "Multispectral Brain Tumor Segmentation based on Histogram Model Application", Proc. of SPIE, vol. 6514, pp. 1-10, 2007.

(Continued)

*Primary Examiner* — Siamak Harandi
(74) *Attorney, Agent, or Firm* — GE Global Patent Operation; Marc A. Vivenzio

(57) ABSTRACT

A method for automatic segmentation of a medical image is provided. The method comprises registering a reference image associated with an object to the medical image, determining a transformation function on the basis of the registration, applying the transformation function to a probability map associated with the object; carrying out a probability thresholding on the transformed probability map by selecting a first area of the medical image in which the probability of the object is within a probability range, carrying out an intensity thresholding on the medical image by selecting a second area of the medical image in which the intensity is within an intensity range, selecting a common part of the first and second areas and carrying out on the common part a morphological opening resulting in separate sub-areas, selecting the largest sub-area as a seed, and segmenting the medical image on the basis of the seed.

11 Claims, 5 Drawing Sheets

(56) References Cited

OTHER PUBLICATIONS

Park et al., "Construction of an Abdominal Probabilistic Atlas and its Application in Segmentation", IEEE Transacitons on Medical Imaging, vol. 22, No. 4., pp. 483-492 Apr. 2003.

Yushkevich et al., "User-Guided 3D Active Contour Segmentation of Anatomical Structures: Significantly Improved Efficiency and Reliability", NeuroImage, vol. 31, pp. 1116-1128, 2006.

Gyorgy Bekes et al., "3D Segmentation of Liver, Kidneys and Spleen from CT Images", Computer Assisted Radiation Therapy, Int J CARS 2007, vol. 2, pp. S45-S47.

* cited by examiner

METHOD, SYSTEM AND COMPUTER READABLE MEDIUM FOR AUTOMATIC SEGMENTATION OF A MEDICAL IMAGE

BACKGROUND OF THE INVENTION

The subject matter disclosed herein relates to a method, a system and a computer readable medium for automatic segmentation of a medical image. More particularly, the disclosed subject matter relates to image processing, and to systems and methods for medical imaging with image recognition and image registration capabilities.

Segmentation of anatomical structures in medical images is a fundamental task in a number of clinical processes in the field of oncology, radiology and in planning surgical interventions. Exemplary techniques for imaging include conventional X-ray plane film radiography, computed tomography ("CT") imaging, magnetic resonance imaging ("MRI"), and nuclear medicine imaging techniques, such as positron emission tomography ("PET") and single photon emission computed tomography ("SPECT"). Segmentation is used to measure the size and shape of anatomical structures, to guide spatial normalization of anatomy between individuals and to plan medical interventions. The spectrum of available segmentation approaches is broad, ranging from manual outlining of structures in 2D cross-sections to more developed methods that use a so called 'registration' to find optimal correspondences between 3D images and a labeled probability map or atlas. There are also known semiautomatic approaches that combine the efficiency and repeatability of automatic segmentation with the human judgment that can only come from skilled expertise.

Despite the fact that a large number of fully automatic and semiautomatic segmentation methods have been disclosed, still manual delineation is generally used as the technique of choice for image segmentation. Reluctance to use the fully automatic approach is due to the concerns about its insufficient reliability in cases where the target anatomy may differ from the norm, as well as due to high computational demands of the approach based on image registration.

Manually tracing the outlines on a contiguous set of 2D slices, and then combining them, can be time consuming and labor intensive. Time and labor increase significantly both as the number of image slices increase, and as a number and size of an organ, tumor, etc. in an anatomical area of interest increases. Quality of the outlining and quality of a produced 3D object depend on a resolution and contrast of the 2D slices, and on knowledge and judgment of the clinician performing the reconstruction.

Using reliable automatic image segmentation could save time and labor, and could increase precision by eliminating subjectivity of the clinician.

Automated image segmentation of organs faces certain challenges. Some organs are located in a soft tissue environment wherein resolution against surrounding structures has poor contrast since neighboring organs have similar density values. Furthermore, shape and position of organs may change periodically. Characteristics of abdominal organs also change from patient to patient including for example, shape, size and location of the organ. Imaging parameters of CT machines vary as well.

Significant efforts have also been directed toward the development of templates for segmentation of the human organs. In model-based segmentation, transforming a medical image, which is a CT image or a series of CT images (often called as a CT study, CT volume or CT exam) to a common reference frame is a useful step before commencing segmentation. Transforming a medical image to a common reference frame is generally called registering the medical image. It is assumed that anatomic regions of different medical images are found in approximately a same voxel region. Thus, a probability map (also called as probability atlas or statistical atlas) may be generated on the basis of a large number of medical images, that represents a probability that a given voxel is a part of a particular organ. Given the probability map, a new medical image may be registered to a reference image to determine transformation function or transfer parameters. The reference image is usually selected from medical images of the average patients. The transformation function may then be applied to transform the probability map data to a coordinate system of the medical image to be segmented to help initialize a segmentation algorithm.

Segmentation is the process of assigning labels to individual voxels in the data set. Automatic segmentation thereby means automated recognition and labeling of human anatomical structures in 2D or 3D digital scans of the human body.

Region growing techniques have also been widely used in image processing and analysis and include a process of recursively packing connected pixels according to some criteria. The process starts from one (or more) pixel called a seed, and checks all pixels in its immediate neighborhood. Those pixels that satisfy some criteria, for example, their intensity value is larger than a pre-defined threshold, are collected or grouped together. The process then continues recursively from each collected pixel until no more pixels can be collected. Apart from the above region growing method, other similar techniques are also known for this purpose, for example the so called active contour method expanding an initial seed volume surrounded by an initial contour to the segmented volume of the organ. Throughout the present description and claims, all feasible methods suitable for growing or expanding a segmented area from a seed is called 'growing method'.

A major limitation with existing growing methods is the need for human interaction to manually select the seed. There were some efforts to achieve automatic seed selection, but no practically applicable solution has been found so far. It is also a problem that no automated validation has been provided so far to achieve a safe final check of the automated segmentation.

U.S. Pat. No. 7,259,762 discloses a method for detecting and segmenting organs and structures in a medical image. Structural connections are analyzed, registration and region growing is used in this known organ segmentation. US 2007/0160277 A1 discloses a method for segmenting various brain structures on MRI images using an anatomical template and graph cut algorithms in an iterative approach. US 2010/0054525 A1 discloses a system and a method for automatic recognition and labeling of anatomical structures and vessels in medical imaging scans.

Automatic segmentations (either atlas based or not) is a long researched topic, numerous articles are published in this topic. Examples are the following: 3D segmentation of liver, kidneys and spleen from CT images, Gyorgy Bekes et al. (in Computer Assisted Radiation Therapy, Int J CARS (2007) 2 (Suppl 1):S45-47); Construction of an abdominal probabilistic atlas and its application in segmentation, Hyunjin Park et al. (in IEEE Transactions on Medical Imaging, Vol. 22, No. 4, April 2003, pp. 483-492); and User-guided 3D active contour segmentation of anatomical structures: Significantly improved efficiency and reliability, Paul A. Yushkevich et al. (in NeuroImage 31 (2006) 1116-1128).

These known methods do not solve the above problems of automatic segmentation.

Thus, there is a need for a solution allowing an improvement over existing methods and systems. There is a need for automatic segmentation method, computer program and system eliminating as much as possible the shortcomings of known techniques. There is a particular need for an automatic segmentation method allowing automated seed selection and final validation of the segmentation results. There is also a need for an automatic segmentation method that eliminates the concerns about insufficient reliability of automated segmentation.

BRIEF SUMMARY OF THE INVENTION

In an exemplary embodiment, a method is provided for automatic segmentation of a medical image, the medical image comprising an object image to be segmented. The method comprises registering a reference image associated with the object to the medical image, determining a transformation function on the basis of the registration, and applying the transformation function to a probability map associated with the object. The method further comprises carrying out a probability thresholding on the transformed probability map by selecting a first area of the medical image in which the probability of the object is within a probability range, carrying out an intensity thresholding on the medical image by selecting a second area of the medical image in which the intensity is within an intensity range, selecting a common part of the first and second areas and carrying out on the common part a morphological opening resulting in separate sub-areas of the common part, selecting the largest sub-area as a seed, and segmenting the medical image on the basis of the selected seed.

In a further exemplary embodiment, a system is provided for automatic segmentation of a medical image, the medical image comprising an object image to be segmented. The system comprises a registering unit configured to register a reference image associated with the object to the medical image, and to determine a transformation function on the basis of the registration, and a transforming unit configured to apply the transformation function to a probability map associated with the object. The system further comprises a probability thresholding unit configured to carry out probability thresholding on the transformed probability map by selecting a first area of the medical image in which the probability of the object is within a probability range, an intensity thresholding unit configured to carry out an intensity thresholding on the medical image by selecting a second area of the medical image in which the intensity is within an intensity range, a morphological opening unit configured to carry out a morphological opening on a common part of the first and second areas, resulting in separate sub-areas of the common part, a selecting unit configured to select the largest sub-area as a seed, and a segmenting unit configured to segment the medical image on the basis of the selected seed.

BRIEF DESCRIPTION OF THE DRAWINGS

Characteristics, objectives and advantages of embodiments of the subject matter will become apparent from the following description, which is given solely by way of illustration and is non-limiting, and is to be read with reference to the appended drawings in which.

DETAILED DESCRIPTION OF THE INVENTION

Figure 1:
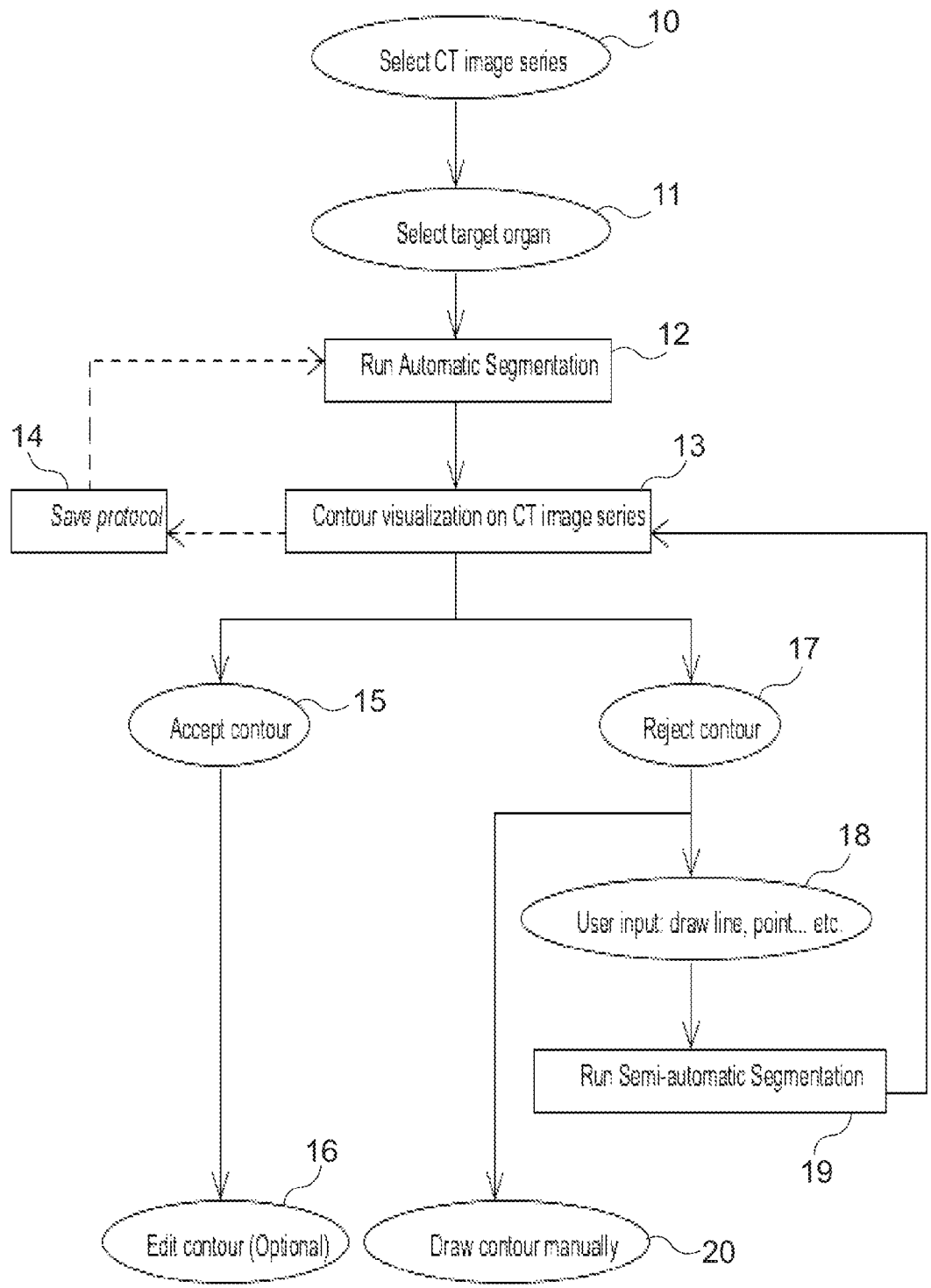
FIG. 1 illustrates a flowchart of a typical clinical workflow comprising automated segmentation.

An automatic segmentation method according to the subject matter disclosed herein can decrease the processing time and makes possible to establish an alternative clinical workflow, wherein the algorithms can be executed before the user starts to work with the images, e.g. the algorithm can run during the night or during the image transfer from a CT console to a workstation. When the user starts working on the images, suggested contours are already available, which saves a considerable amount of time. These contours may need supervising and editing, but these take significantly less time than fully manual contouring. The automatic segmentation disclosed herein is proved to be accurate and robust not requiring any post editing, and successfully eliminating the problems related to inter- and intra-operator variability.

In another exemplary embodiment, a computer readable medium comprising a computer readable program is provided for automatic segmentation of a medical image, wherein the computer readable program when executed on a computer causes the computer to perform the steps of the above method.

An embodiment may be embodied in the form of computer-implemented processes and apparatuses for practicing those processes. An embodiment may also be embodied in the form of a computer program code containing instructions embodied in tangible media, such as floppy diskettes, CD-ROMs, hard drives, or any other computer readable storage medium, wherein, when the computer program code is loaded into and executed by a computer, the computer becomes an apparatus for carrying out the method. An embodiment may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for carrying out the method. When implemented on a general-purpose microprocessor, the computer program code segments configure the microprocessor to create specific logic circuits.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Embodiments can take the form of an entirely hardware embodiment, an entirely software embodiment or an embodiment including both hardware and software elements. In a preferred embodiment, the present invention is implemented in software, which includes but is not limited to firmware, resident software, microcode, etc.

The subject matter disclosed herein describes a contouring workflow of a radiotherapy system, which is extended with a user supervised fully automatic abdominal organ segmentation tool for CT studies. Besides the automatic nature of segmentations, the workflow is also extended with an artificial intelligence based validation system to detect failures of the automatic segmentations, when the algorithms cannot handle the special anatomical attributes of the patient and unwanted over- or under-segmentations may occur. Exemplary target organs are the liver, the spleen and the left and right kidneys.

The subject matter disclosed herein is an extension to the current clinical abdominal organ segmentation workflow. The current workflow contains the following steps as depicted in FIG. 1. Ellipses in the workflow represent steps involving user interaction/supervising, rectangles represent automated functions. First, a user selects in step 10 a medical image, which is usually an abdominal CT image series. In step 11, the user selects an organ for contouring. Step 12 represents an automatic organ segmentation, which runs in the background. The contour of the selected organ is visualized on the CT image series in step 13. The user can decide to accept or reject the visualized contour. Step 15 represents that the user accepts the contour. If the user accepts the generated contours, there is an option to edit or refine contour borders manually in step 16. If the user is not satisfied with the accuracy and rejects the contour in step 17, the user can decide to draw the whole contour manually in step 20 or run a semi-automatic method in steps 18 and 19 for organ segmentation. If the generated contour is rejected and the semi-automatic method is chosen, the user has to provide an input for it in step 18; semi-automatic segmentation methods represented by step 19 require various user interactions. The user is also able to save automatic segmentation preferences to a personalized protocol in step 14. In this way, next time the selected organs on a different CT series are automatically segmented in the loading time of the protocol without any interaction.

Figure 2:
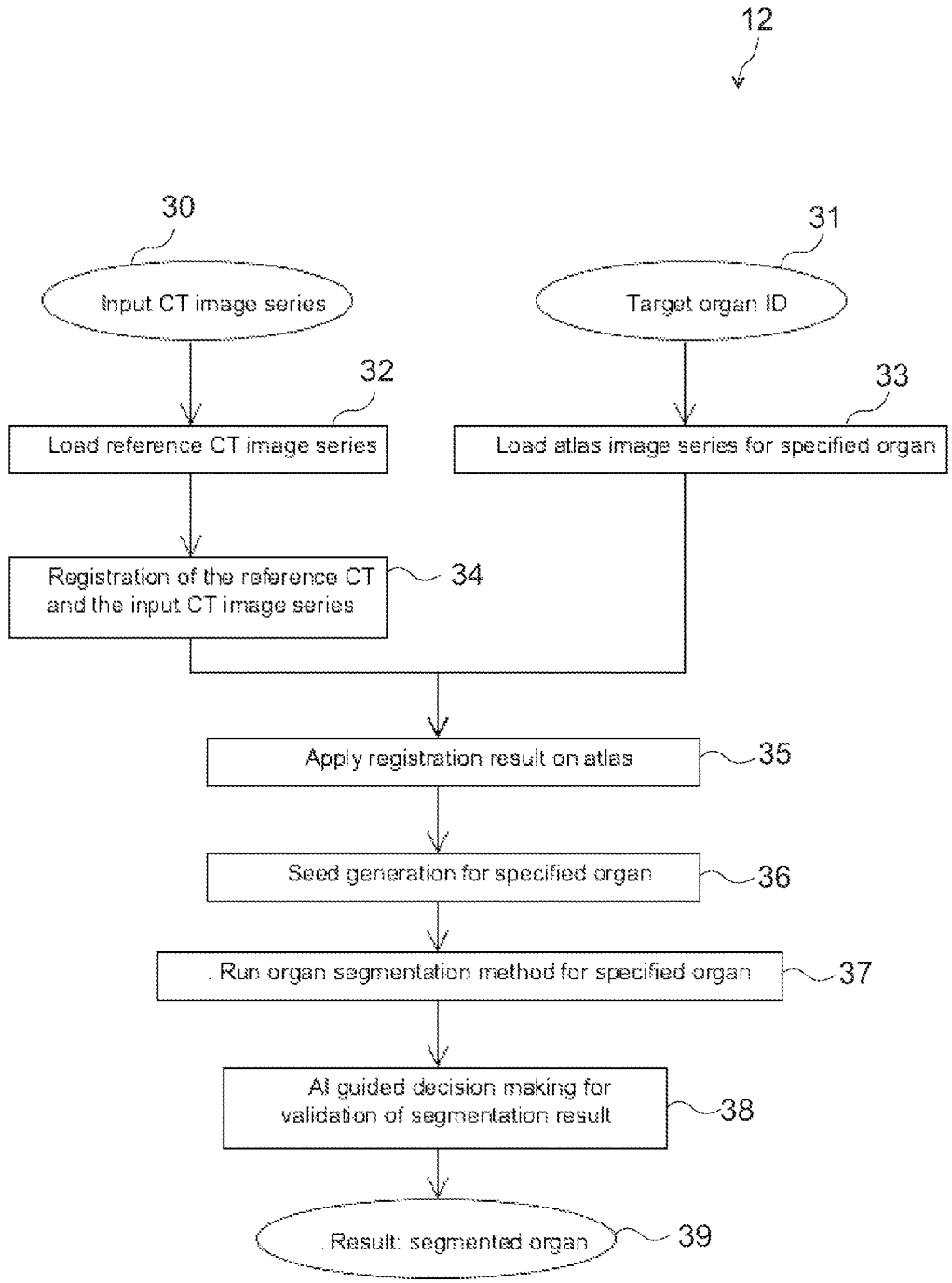
FIG. 2 shows a flowchart of an automatic segmentation in accordance with the subject matter described herein.

The subject matter disclosed herein is the automation of the organ segmentation process, extended with artificial intelligence guided contour validation. A method for automatic segmentation of a medical image comprising an object image to be segmented is illustrated in FIG. 2, which is a detailed description of step 12 in FIG. 1.

An abdominal CT image series, called as a medical image, is input in step 30. Then an organ is selected for contouring in step 31. In step 32, a reference image associated with the object is loaded into the memory. A reference image associated with the object in this context means a reference image, which comprises an image part containing an image of the object to be segmented. A probability map associated with the object, i.e. an atlas of the target organ is also loaded into the memory in step 33. The probability map is created on the basis of a large number of medical images, also containing the reference image belonging to a typical member of the population. In registering step 34, the reference image is registered to the medical image, for example, to the input CT exam resulting in a transformation function comprising transformation parameters. The transformation function may comprise overall translations, rotations and re-sizing, but it can be complex as well and may also comprise e.g. local or non-linear transformations. Next in step 35, the transformation function is applied on the probability map associated with the object, i.e. on the atlas of the target organ. This provides an approximate location for the object in the medical image.

Next, the CT values are combined with the probability values of the transformed probability map, the detailed description of which can be found below in connection with FIG. 3, to generate a seed region inside the target organ in step 36. The seed is used for an automatic segmentation of the medical image in step 37. The segmenting step 37 comprises a growing of a region from the seed by means of a suitable growing method. Alternatively, the transformed (or in other words: registered) probability map is also used for the automatic segmentation to force the segmentation to acquire a shape corresponding to the expected probabilities.

The automatic segmentation may still contain errors due to errors in the registration and seed generation steps 34 and 36. As it may be desirable to reduce the number of the wrong contours, a validation step 38 removes suspicious results by using an artificial intelligence method trained on various metrics of acceptable results. This validation can be very useful because physicians do not want to see bad/useless results/contours. A post validation helps to prevent losing reliability. The output is the contour of the target organ in step 39 if it passes the validation step. Otherwise the output is an error message.

Figure 3:
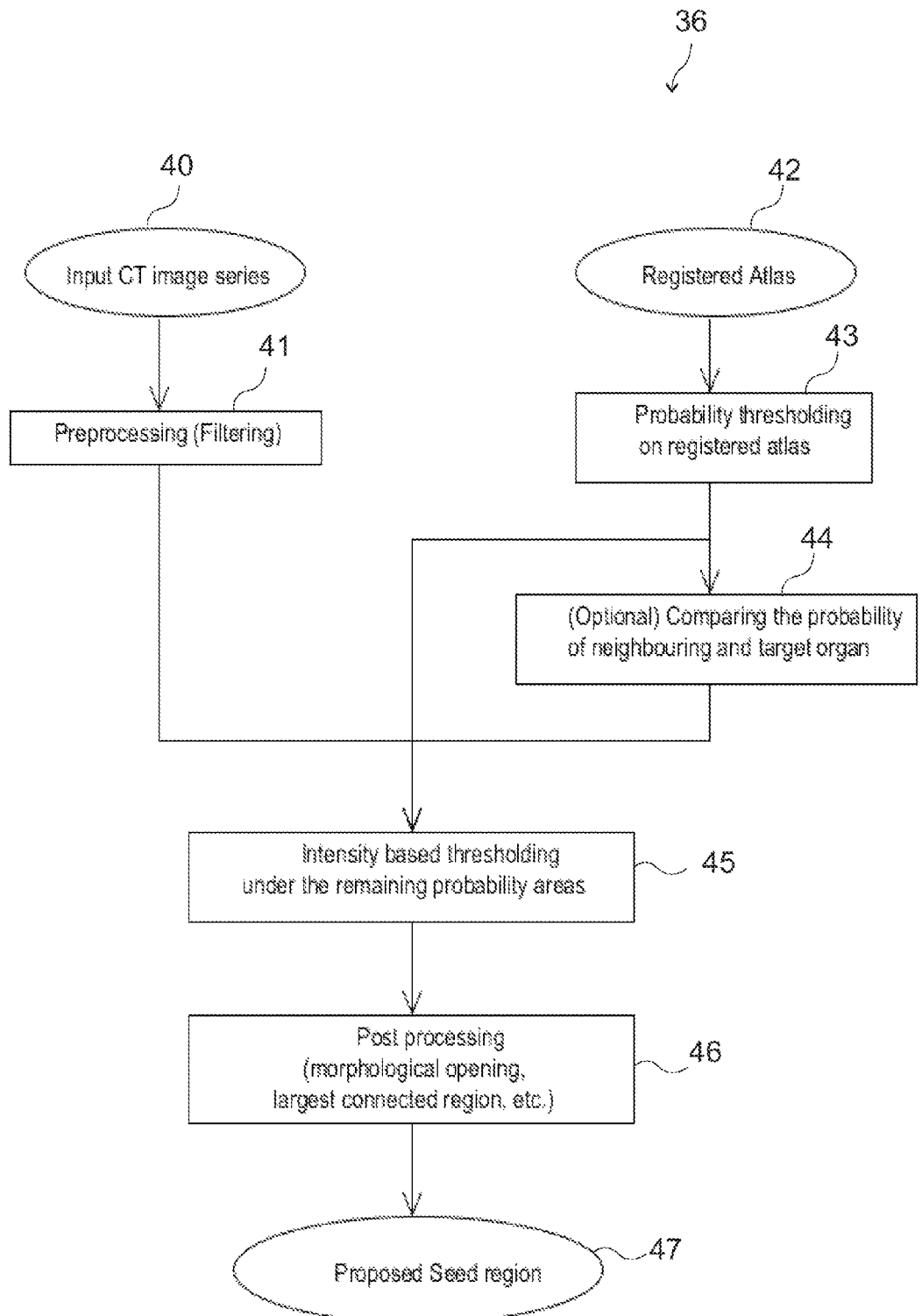
FIG. 3 illustrates a flowchart of an automatic seed generation in accordance with the subject matter described herein.

FIG. 3 illustrates a flowchart of an automatic seed generation of step 36 in accordance with the subject matter described herein. The input medical image is loaded into the memory in step 40. Alternatively, a preprocessing/filtering step 41 follows, which eliminates the noise from the CT medical image. The transformed (registered) probability map is loaded into the memory in step 42. Next, a probability thresholding step 43 is carried out on the transformed probability map by selecting a first area of the medical image in which the probability of the object is within a probability range. The probability range may mean a range from 100% to a lower limit, in which case only an area reaching a predetermined probability level is selected as the first area. The probability ranges or limits of given objects, e.g. organs are different from each other, and are adjusted in a heuristic way. The first area may comprise both joined and separated sub areas of the medical image.

Optionally, in step 44, the transformation function is applied to at least one further probability map associated with a further object, a probability thresholding on the transformed further probability map is carried out, and areas in which the probability of the further object is within a further probability range are deselected from the first area. In this way the selection of the first area, corresponding to the most probable location of the target organ, can be effected more reliably.

Next, an intensity thresholding on the medical image is carried out in step 45 by selecting a second area of the medical image in which the intensity is within an intensity range. Certain organs have their certain intensity ranges, so this step deselects areas in which the intensities are too low (e.g. fat tissues, cavities) or too high (e.g. bones). Again, the second area may comprise joined and separated sub areas as well.

The intensity thresholding step 45 is carried out after the probability thresholding step 43, and is carried out on the selected first area only. In this way considerable computing time can be saved. A morphological dilatation step (not depicted) is applied on bone image parts before the intensity thresholding step. In this way the gaps between the parts of the skeleton structure can be filled and muscles adhering to the bones can be excluded from erroneous recognition of organs.

Next, a common part of the first and second areas are selected and a morphological opening step 46 is carried out on the common part resulting in separate sub-areas of the common part. Morphological opening means a morphological erosion followed by a morphological dilatation, by means of which small noise parts are eliminated and the large regions are separated into separate sub-areas. The largest sub-area is selected in step 47 as a seed, and the automatic segmentation of the medical image is carried out on the basis of the selected seed.

The results of the automatic segmentation are validated in step 38 of FIG. 1. The validating step 38 is carried out on the basis of at least one thresholding criterion selected from the following group: volume, enclosing block volume, ratio of volume/enclosing block volume, enclosing sphere volume, ratio of volume/enclosing sphere volume, enclosing sphere volumes of slices, and axial distortion.

Figure 4:
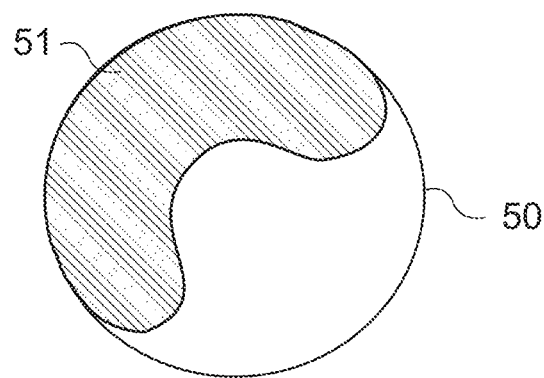
FIG. 4 schematically shows a correctly segmented liver in axial view.
Figure 5:
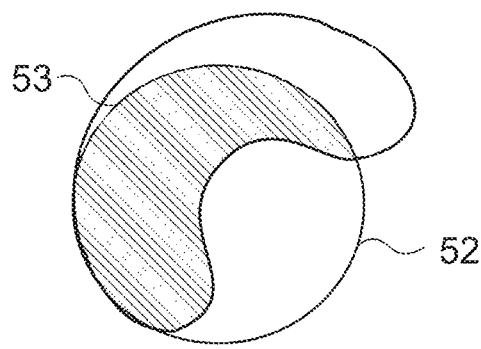
FIG. 5 schematically shows an under-segmented liver in axial view.
Figure 6:
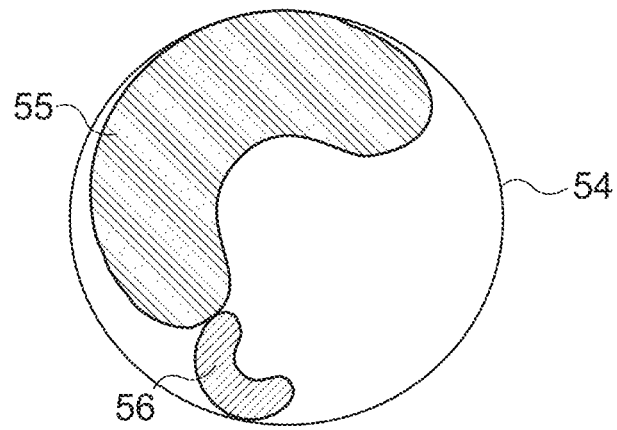
FIG. 6 schematically shows an over-segmented liver in axial view.

FIGS. 4 to 6 schematically show a correctly segmented, an under-segmented and an over-segmented liver in axial views, respectively. FIG. 4 depicts a segmentation 50 of a segmented area 51 of a liver. In FIG. 5 a segmentation 52 defines a segmented area 53 which does not contain the entire liver. Segmentation 54 depicted in FIG. 6 contains a segmented area 55 of a liver, and in addition a segmented area 56 of a kidney. By means of the thresholding criteria above, the erroneous segmentations according to FIGS. 5 and 6 can be detected in an easy way.

Figure 7:
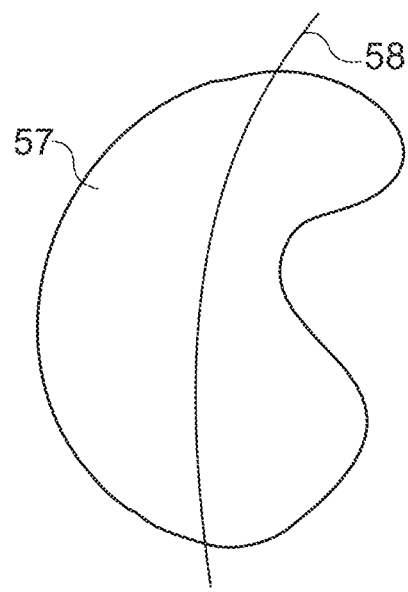
FIG. 7 schematically illustrates a kidney in coronal view validated as correctly segmented on the basis of the detected axial distortion.
Figure 8:
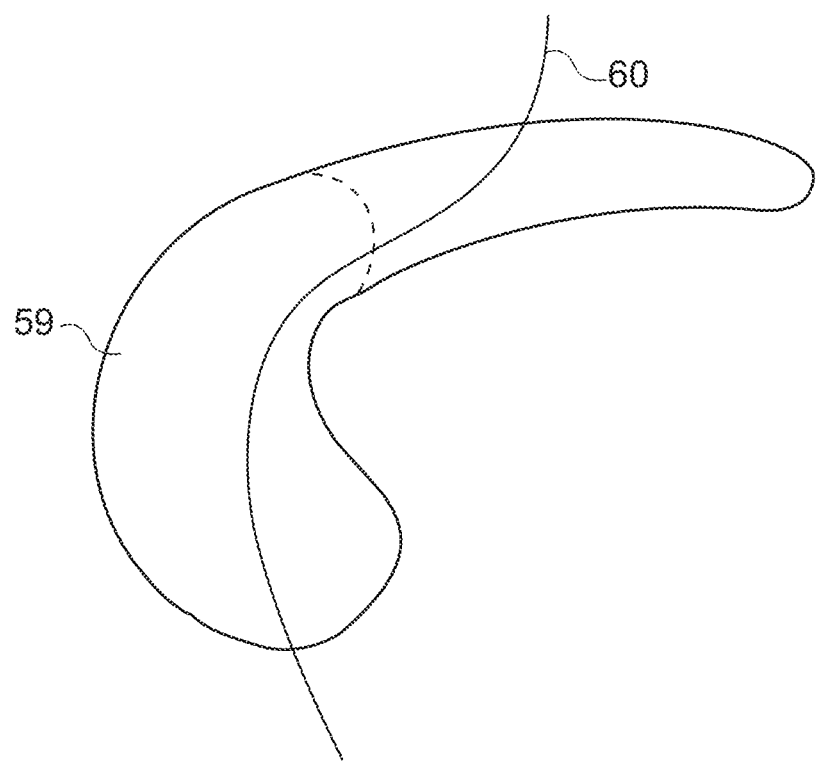
FIG. 8 schematically illustrates a kidney in coronal view validated as over-segmented on the basis of the detected axial distortion.

FIGS. 7 and 8 schematically show a kidney in coronal view validated as correctly segmented and over-segmented, respectively, on the basis of the detected axial distortion. A segmented area 57 in FIG. 7 has a detected axis 58 having a distortion within a predetermined credibility range; however, segmented area 59 in FIG. 8 has a detected axis 60 with a distortion outside the predetermined credibility range. By means of this particular thresholding criteria, the erroneous segmentation according to FIG. 8 can be easily detected.

An exemplary embodiment is a computer readable medium comprising a computer readable program for automatic segmentation of a medical image, wherein the computer readable program when executed on a computer causes the computer to perform the steps of the above disclosed method.

Another exemplary embodiment is a system for automatic segmentation of a medical image, the system comprising units configured to perform the steps of the above disclosed method. These units can take the form of an entirely hardware embodiment, an entirely software embodiment or an embodiment including both hardware and software elements.

A technical advantage of the subject matter disclosed herein is that it enables to automatically segment abdominal organs on non-contrast enhanced CT scans. Currently, this feature is not offered, only semi-automatic methods are available. The method can be adopted to all medical applications, and parts of the workflow can facilitate solving other abdomen localization and segmentation problems.

This written description uses examples to disclose embodiments of the invention, including the best mode, and also to enable any person skilled in the art to practice the invention, including making and using any devices or systems and performing any incorporated methods. The patentable scope of embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for automatic segmentation of a medical image, the medical image comprising an object image to be segmented, the method comprising:
   registering a reference image associated with the object to the medical image;
   determining a transformation function on the basis of the registration;
   applying the transformation function to a probability map associated with the object;
   carrying out a probability thresholding on the transformed probability map by selecting a first area of the medical image in which the probability of the object is within a probability range;
   carrying out an intensity thresholding on the medical image by selecting a second area of the medical image in which the intensity is within an intensity range;
   selecting a common part of the first and second areas and carrying out on the common part a morphological opening resulting in separate sub-areas of the common part;
   selecting the largest sub-area as a seed; and
   segmenting the medical image on the basis of the selected seed.

2. The method according to claim 1, further comprising applying the transformation function to at least one further probability map associated with a further object;
   carrying out a probability thresholding on the transformed further probability map; and
   deselecting areas from the first area in which the probability of the further object is within a further probability range.

3. The method according to claim 1, further comprising applying a morphological dilatation on bone image parts before carrying out an intensity thresholding on the medical image.

4. The method according to claim 1, further comprising validating the segmentation on the basis of at least one thresholding criterion selected from the group consisting of volume, enclosing block volume, ratio of volume/enclosing block volume, enclosing sphere volume, ratio of volume/enclosing sphere volume, enclosing sphere volumes of slices, and axial distortion.

5. The method according to claim 1, wherein segmenting the medical image on the basis of the selected seed comprises growing a region from the seed with a growing method.

6. A non-transitory computer readable medium comprising a computer readable program for automatic segmentation of a medical image, wherein the computer readable program when executed on a computer causes the computer to perform the steps of the method according to claim 1.

7. A system for automatic segmentation of a medical image, the medical image comprising an object image to be segmented, the system comprising:
   a computer comprising a computer memory;
   a registering unit stored in the computer memory configured to register a reference image associated with the object to the medical image, and to determine a transformation function on the basis of the registration;
   a transforming unit stored in the computer memory configured to apply the transformation function to a probability map associated with the object;
   a probability thresholding unit stored in the computer memory configured to carry out probability thresholding on the transformed probability map by selecting a first area of the medical image in which the probability of the object is within a probability range;

an intensity thresholding unit stored in the computer memory configured to carry out an intensity thresholding on the medical image by selecting a second area of the medical image in which the intensity is within an intensity range, a morphological opening unit stored in the computer memory configured to carry out a morphological opening on a common part of the first and second areas, resulting in separate sub-areas of the common part, a selecting unit stored in the computer memory configured to select the largest sub-area as a seed, and a segmenting unit stored in the computer memory configured to segment the medical image on the basis of the selected seed.

8. The system according to claim 7, further comprising a further registering unit stored in the computer memory configured to apply the transformation function to at least one further probability map associated with a further object, to carry out a probability thresholding on the further probability map, and to deselect areas from the first area in which the probability of the further object is within a further probability range.

9. The system according to claim 7, further comprising a morphological dilatation unit stored in the computer memory configured to apply a morphological dilatation on bone image parts.

10. The system according to claim 7, further comprising a validating unit stored in the computer memory configured to validate the segmentation on the basis of at least one thresholding criterion selected from the group consisting of volume, enclosing block volume, ratio of volume/enclosing block volume, enclosing sphere volume, ratio of volume/enclosing sphere volume, enclosing sphere volumes of slices, and axial distortion.

11. The system according to claim 7, wherein the segmenting unit is further configured to grow a region from the seed with a growing method.

\* \* \* \* \*